United States Patent
Yang et al.

(10) Patent No.: US 6,349,158 B1
(45) Date of Patent: Feb. 19, 2002

(54) HYBRID CASCADE STRUCTURE FOR DWDM

(75) Inventors: Yawen Yang, Newark; Suyou He, Fremont, both of CA (US)

(73) Assignee: Tera Fiberoptics, Inc, Fremont, CA (US)

( * ) Notice: Subject to any disclaimer, the term of this patent is extended or adjusted under 35 U.S.C. 154(b) by 0 days.

(21) Appl. No.: 09/679,742

(22) Filed: Oct. 5, 2000

(51) Int. Cl.$^7$ ................................................. G02B 6/28
(52) U.S. Cl. .......................................... 385/24; 359/127
(58) Field of Search ............................... 385/24, 37, 46, 385/15; 359/127, 115, 124, 160, 279, 344

(56) References Cited

U.S. PATENT DOCUMENTS

| | | | | |
|---|---|---|---|---|
| 5,978,114 A | * | 11/1999 | Clark et al. | 359/115 |
| 6,041,152 A | * | 3/2000 | In | 385/24 |
| 6,049,640 A | * | 4/2000 | Doerr | 385/15 |
| 6,069,732 A | * | 5/2000 | Koch et al. | 359/344 |
| 6,141,467 A | * | 10/2000 | Doerr | 385/24 |

* cited by examiner

*Primary Examiner*—Akm E. Ullah
(74) *Attorney, Agent, or Firm*—John F. Schipper

(57) ABSTRACT

System and method for wavelength discrimination using a DWDM cascade tree structure with distributed filtering to provide acceptable optical isolation and acceptable flat-top wavelength response. Each channel has a Mach-Zehnder interferometer (MZI), or an MZI combined with a phase shift mechanism (a PSMZI), that provides wavelength discrimination in each channel of the structure. The phase shift mechanism may be a Gires-Tournois resonator, selectively tuned for each channel. The number of output channels may be 32, 64, 128 or more, and the light in each output channel satisfies the BellCore standards for optical isolation, flat-top wavelength response and crosstalk suppression.

8 Claims, 9 Drawing Sheets

HYBRID CASCADE STRUCTURE FOR DWDM

FIELD OF THE INVENTION

This invention relates to Dense Wavelength Division Multiplexer (DWDM) devices, and more particularly to DWDM cascade tree structures.

BACKGROUND OF THE INVENTION

A DWDM device can be used to increase the number of communication channels available in a fiber optical system. Today, researchers are studying a few competing technologies. One mature technology, relying on standard filter coatings, is characterized by high signal insertion losses and relatively high cost and is generally useful only for DWDM devices with channel spacing greater than 50 GHz.

A competing technology uses Mach-Zehnder interferometers ("MZIs") and is characterized by low signal insertion loss, low polarization dependent low, relatively low cost, high uniformity and low signal crosstalk and is a more attractive choice for DWDM devices with lower channel spacing. However, standard MZI technology suffers from low isolation between adjacent channels and relatively high passband insertion loss, caused in part by instability of the light source. These latter two problems make it difficult for a DWDM device relying only on standard MZI technology to comply with DWDM standards (optical isolation, flat-top response) set down by BellCore. If these two problems can be either solved or reduced in severity, DWDM devices relying on MZI technology could become widely used in voice, data and image communications.

What is needed is a DWDM system having low signal insertion loss, low polarization dependent loss, high uniformity, relatively low signal crosstalk, acceptable channel isolation and acceptably low passband insertion loss. Preferably, the system should have acceptably low cost and should be flexible enough to meet various commercial communication requirements. Preferably, the system should meet the BellCore standards for optical isolation, for "flat-top" wavelength response and for crosstalk suppression.

SUMMARY OF THE INVENTION

These needs are met by the invention, which uses an improved DWDM cascade tree structure with distributed filtering and MZI technology to provide acceptable channel isolation for relatively low channel spacing and to comply with the BellCore standards for optical isolation, for flat-top passband response and for crosstalk suppression within the channels, over a system of $2^N$ output channels for 50 GHz channel spacing with N=5, 6, 7, . . . The basic structure is a bifurcated or cascade tree system with N+1 stages, numbered n=0, 1, 2, . . . , N, with stage 0 being a light input channel, with stage number n having $2^n$ fiber optical channels in parallel, with each channel in stage n having an MZI, defined by two 3 dB couplers and two parallel fiber optic arms of unequal length, at the beginning of the channel, and with each channel except an output channel or port feeding an MZI that is part of stage n+1 (n=1, 2, . . . , N-1). A "stage", as used herein, refers to a group of one or more parallel fiber optic channels, with each channel having an MZI positioned at the beginning of the channel for wavelength discrimination. A typical cascade tree structure of fiber optic channels is disclosed and discussed in U.S. Pat. Nos. 5,809,190 and 5,987,201, issued to P. Z. Chen (FIG. 1 and discussion), incorporated by reference herein.

In an embodiment of the invention, each channel in each stage, except an input channel, includes an MZI, or an MZI combined with a phase shift mechanism, for low signal insertion loss and wavelength discrimination within that channel.

The channels in three independently selected stages, preferably the first three stages, include a combined MZI and phase shift mechanism ("PSMZI"), positioned at the end of each channel. The phase shift mechanism may be a Gires-Tournois optical resonator, or any similar optical resonator, that transmits all lightwave energy it receives, but with an additional, controllable phase shift that depends upon wavelength, refractive index of a separator material, and separation distance of two reflecting surfaces of the resonator.

By introducing an additional, controllable phase shift into light transported within the cascade tree structure, light is processed to comply with the BellCore standards for optical isolation, for flat-top passband response and for crosstalk suppression at the output channels.

DESCRIPTION OF BEST MODES OF THE INVENTION

Figure 1:
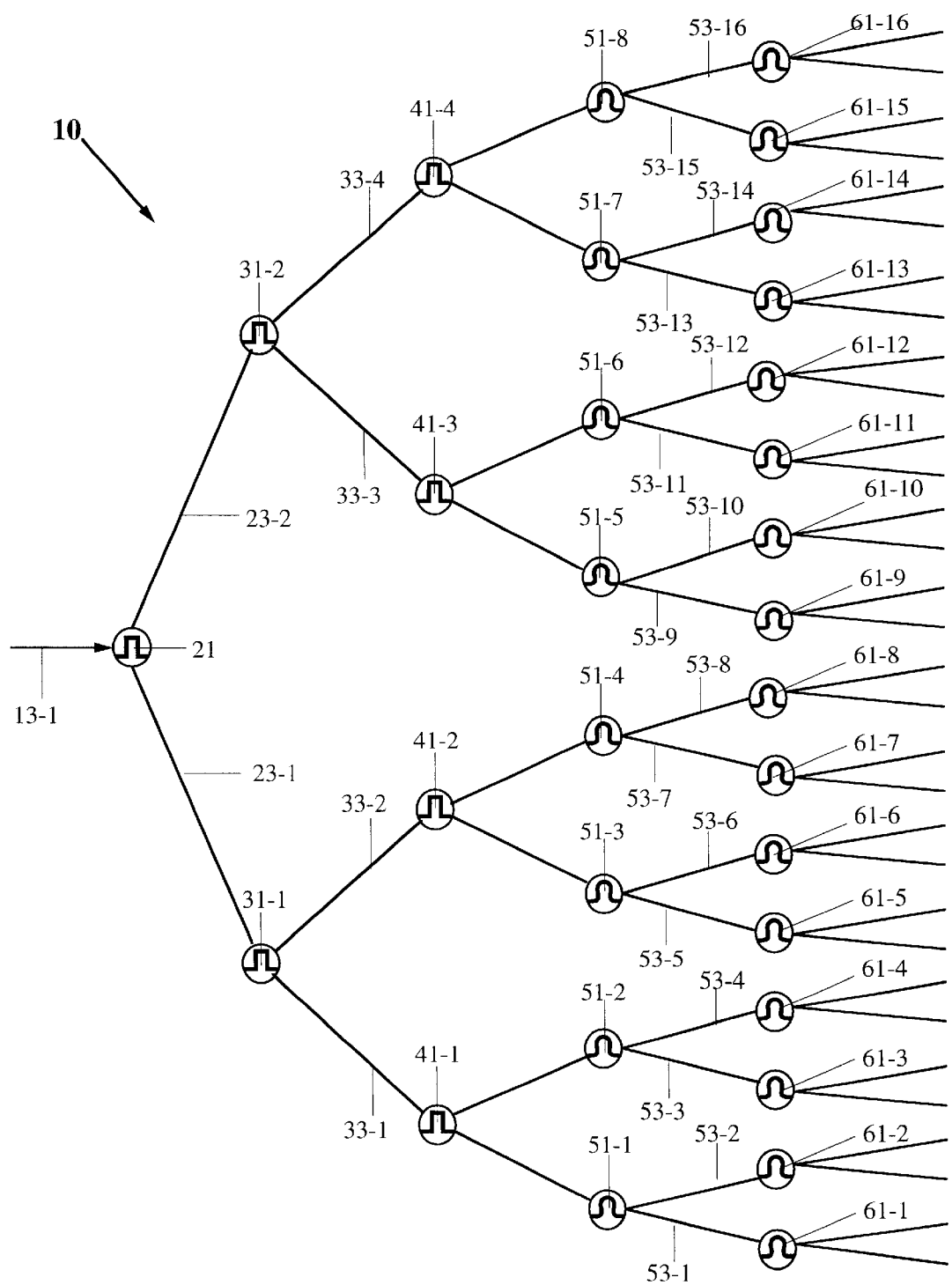
FIG. 1 schematically illustrates a cascade tree structure constructed according to the invention.

FIG. 1 illustrates one embodiment 10 of a DWDM cascade tree structure, which preferably includes one or more MZIs in each channel, to discriminate in favor of, or against, one or more wavelength components. An MZI is discussed generally by M. Born and E. Wolf in *Principles Of Optics*, Pergamon Press, Oxford, Fifth Edition, 1975, pp. 312–316. Use of a tunable optical filters, such as FPEs etalons and MZIs, in a fiber optic network is discussed in a more relevant manner by G. P. Agrawal in *Fiber-Optic Communication Systems*, John Wiley & Sons, New York, Second Edition, 1997, pp. 296–303. Each of three stages, preferably the first three stages, of fiber optic channels also has an additional phase shifter combined with an MZI, to provide a desired flat-top response and optical isolation.

Light having a plurality of wavelengths $\lambda_m$ (m=1, 2, . . .) is received on an input channel 13-1 (stage 0) at a PSMZI 21 that is part of a first stage of a cascade tree structure. The input light is segregated by the wavelength discrimination of the PSMZI, as discussed in the following, into a first group or sub-band of wavelengths and a second group or sub-band of wavelengths with substantially no overlap. Light having the first group and second group of wavelengths proceeds along the channels 23-1 and 23-2 of the first stage and is received by the respective PSMZIs 31-1 and 31-2 that are part of a second stage. Light arriving at each of the PSMZIs 31-1 and 31-2 is again segregated into a first group and a second group of wavelengths with substantially no overlap, by wavelength discrimination at the PSMZIs, and proceeds along one of the channels 33-1, 33-2, 33-3 and 33-4 that are part of the second stage. Light is received from the channels 33-1, 33-2, 33-3 and 33-4 at the respective PSMZIs 41-1, 41-2, 41-3 and 41-4 that are part of a third stage; and light is again segregated into a first group and a second group of wavelengths with substantially no overlap, by wavelength discrimination at the PSMZIs, and proceeds along one of the channels 43-1, 43-2, 43-3, 43-4, 43-5, 43-6, 43-7 and 43-8 that are part of the third stage.

Light is received from the channels 43-1, 43-2, 43-3, 43-4, 43-5, 43-6, 43-7 and 43-8 at the respective MZIs 51-1, 51-2, 51-3, 51-4, 51-5, 51-6, 51-7 and 51-8 that are part of a fourth stage. At the fourth stage and subsequent stages, according to one embodiment of the invention, the wavelength discriminators are conventional MZIs, not PSMZIs. This cascade tree structure is continued for N+1 stages, with N=5 ($2^5$ output channels), 6 ($2^6$ output channels), or another selected integer. The PSMZIs can be used in any three stages, n1, n2 and n3 ($1 \leq n1 < n2 < n3 \leq N$) of the cascade tree structure.

Figure 2:
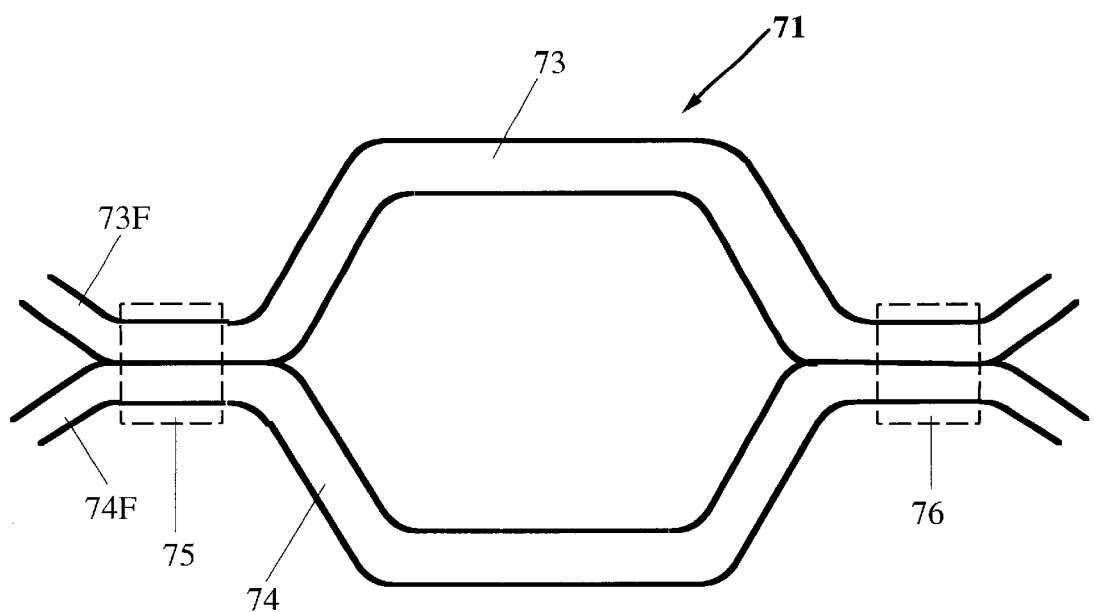
FIGS. 2 and 3 schematically illustrate construction and use of a standard MZI and a combined MZI and phase shift mechanism, respectively.

As illustrated in FIG. 2, a conventional or standard MZI 71 has two fibers, 73F and 74F, with the respective corresponding arms, 73 and 74, of unequal lengths, L1 and L2, respectively. Each arm, 73 and 74, is defined by first and second 3 dB optical fiber couplers, 75 and 76, spaced apart and arranged serially, with coupling coefficients of 0.5 and 0.5 The initial part of each of the arms, 73 and 74, immediately following the first fiber coupler 75, carries a portion of a single light beam, which is then shared approximately equally between the two arms as a result of action of the first fiber coupler. However, because of the length difference, or equivalent time delay $$\tau = (L2-L1)/c \ (\neq 0), \quad (1)$$

interference occurs at the second fiber coupler 76, resulting in transmission of light beyond the second fiber coupler with a transmissivity factor of $$T1(f\tau) = \{1 + \cos(2\pi f\tau)\}/2 = \cos^2(\pi f\tau), \quad (2)$$

$$T2(f\tau) = \{1 - \cos(2\pi f\tau)\}/2 = \sin^2(\pi f\tau), \quad (3)$$

$$f = c/\eta\lambda, \quad (4)$$

where f is the frequency corresponding to a wavelength $\lambda$ included in the incident light and $\pi$ is the optical fiber refractive index. For frequencies near $$f = f1(pass) = m/\tau (m=1, 2, 3, \ldots), \quad (5)$$

light having the corresponding wavelength component is passed by the second fiber coupler 76 and appears in the first fiber 73F with little or no transmissivity loss. For frequencies near $$f = f1(exting) = (m+0.5)/\tau (m=0, 1, 2, 3, \ldots), \quad (6)$$

light having the corresponding wavelength component is extinguished (almost) completely in the first fiber 73F beyond the second fiber coupler 76. The full width at half maximum (FWHM) for the overall filtering action in the first fiber 73F is $$\Delta f = FWHM = \frac{1}{2}\tau. \quad (7)$$

$$\Delta\lambda = 2c/\eta\lambda. \quad (8)$$

The situation in the second fiber 74F, beyond the second fiber coupler 76, is reversed. Light having frequencies near $$f = f2(pass) = (m+0.5)/\tau (m=0, 1, 2, 3, \ldots), \quad (9)$$

appears in the second fiber 74F with little or no transmissivity loss, and light having frequencies near $$f = f2(exting) = m/\tau (m=1, 2, 3, \ldots), \quad (10)$$

is (almost) completely extinguished in the second fiber.

Each MZI, including two spaced apart 3 dB fiber couplers with different fiber lengths between the two couplers, serves as a wavelength discriminator. Beyond the second coupler 76, a first fiber 73F passes (only) light having wavelengths near a first selected set of wavelengths, a second fiber 74F passes (only) light having wavelengths near a second selected set of wavelengths, and the first and second selected sets of wavelengths are mutually exclusive. Thus, if an MZI is placed at the end of, and receives light from, an input fiber optic channel, the two output fibers for the MZI will each carry light having primarily a different selected set of wavelength components.

Figure 3:
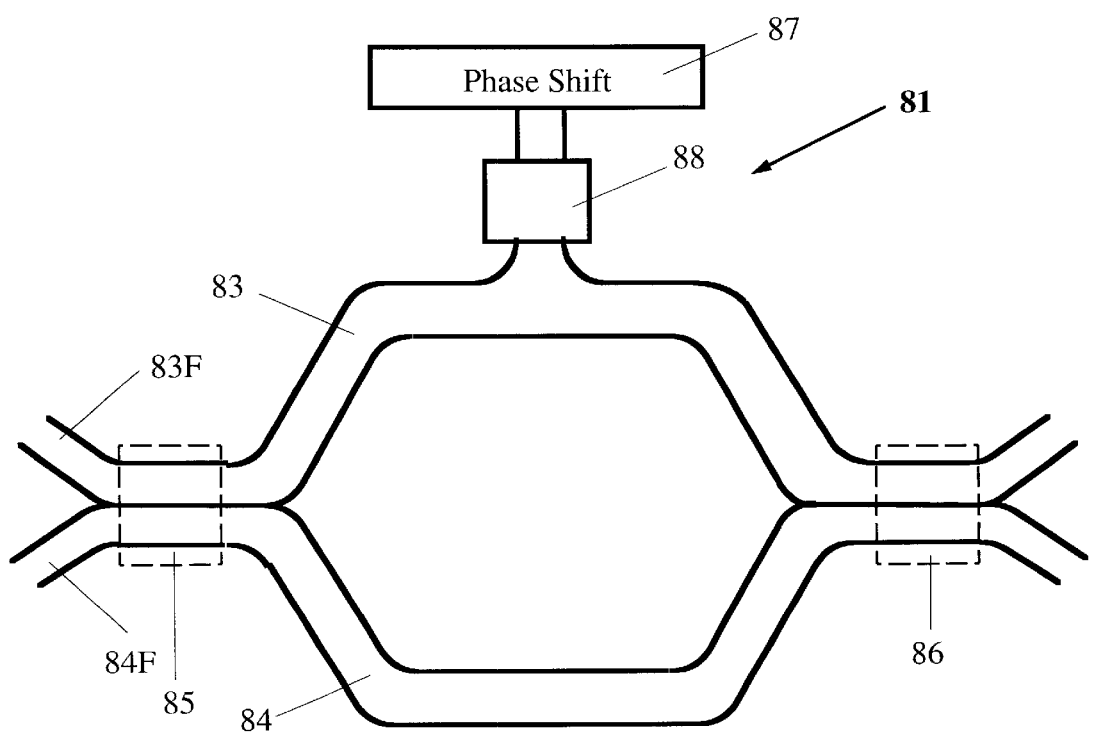

The invention also uses a combined MZI 81 and phase shift mechanism 87, illustrated in FIG. 3, with the phase shift mechanism preferably being incorporated in a first arm 83 of the MZI between first and second fiber couplers, 85 and 86, that define the MZI. A second arm 84 of the MZI 71 is the same as the second arm 74 in the MZI 71 shown in FIG. 2. The two arms, 83 and 84, of the MZI 81 have a non-zero length difference, L2–L1, as in the configuration shown in FIG. 2, and have a selected phase shift that is introduced by the phase shift mechanism 77 in the first arm 83.

The phase shift mechanism 87 preferably includes a Gires-Tournois resonator ("GTR"), discussed in the following, that receives a light beam at normal incidence, introduces a selected phase shift depending upon wavelength $\lambda$, upon separation distance D of two reflectors in the GTR, upon a reflection coefficient for one of the GTR reflectors, and upon refractive index of a separator material in the GTR. The GTR (re)transmits the light beam with the same total light beam energy but as a sequence of time delayed beam components having an associated phase shift. Introduction of a time delayed beam with a selected phase shift in the first arm 83 allows the combined MZI 81 and phase shift mechanism 87 (referred to herein as a "PSMZI") to provide wavelength discrimination, with a controllably flattened peak, with acceptable sideband isolation, and with reduced crosstalk between fiber optic channels. Optionally, the phase shift mechanism 87 includes a light collimator 88 to align the light for transport within the remainder of the channel.

Figure 4:
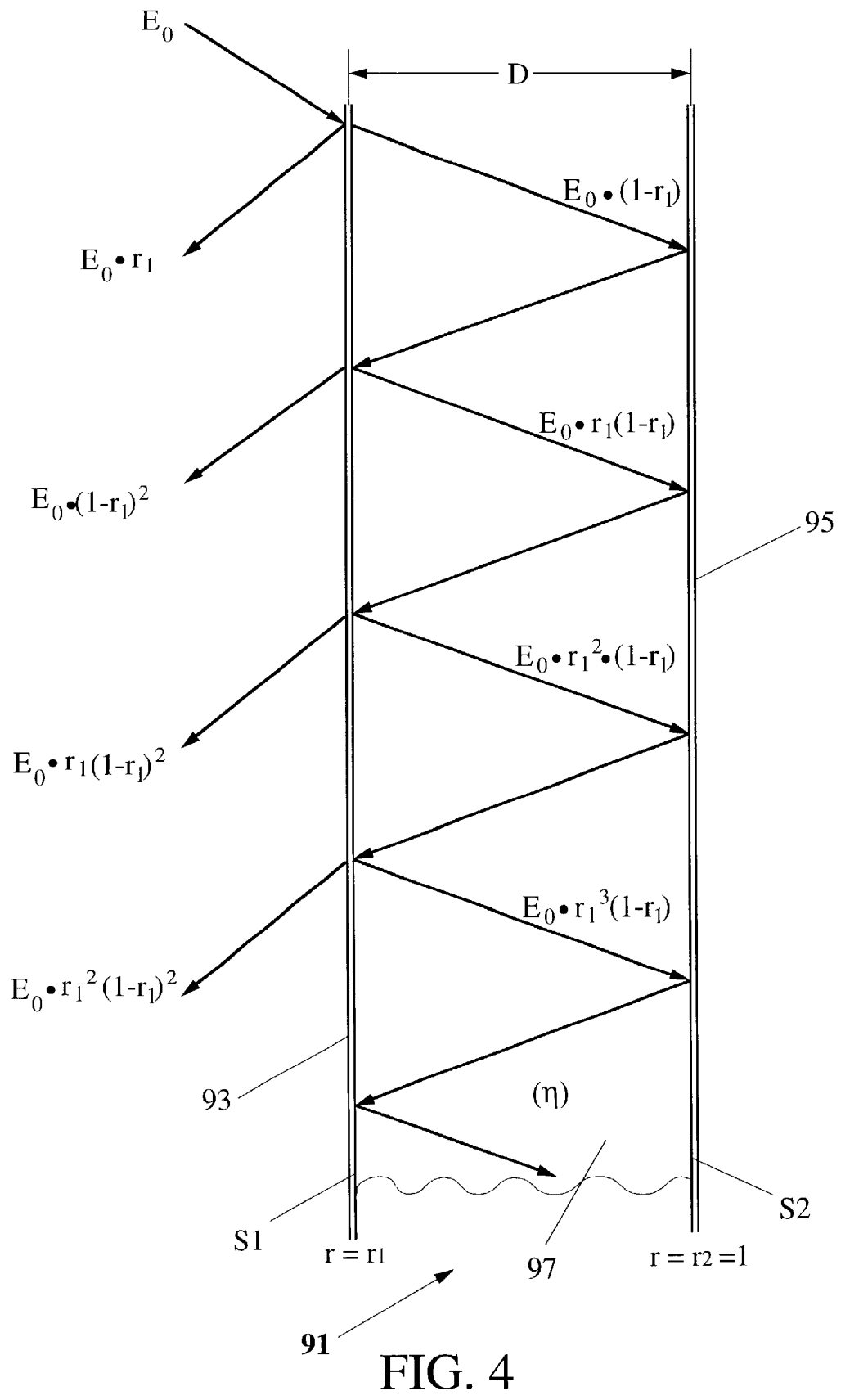
FIG. 4 schematically illustrates optical response of a Gires-Tournois resonator used as a component in an embodiment of the invention.

FIG. 4 illustrates optical response of a GTR 91, used in the phase shift mechanism 87 in FIG. 3, to receipt of a lightwave with wavelength $\lambda$ at normal incidence. A GTR, 91 in FIG. 3, is a non-symmetric version of a Fabry-Perot resonator and was introduced by F. Gires and P. Tournois, Comptes Rendus, vol. 258 (1964) pp. 612. A first surface S1 and a second surface S2 of the GTR 91 are optionally coated with selected thin films, 93 and 95, to provide selected reflection coefficients r=r1 and r=r2, respectively, with $0 < |r1| < 1$ and $|r2| = 1$, where r1 and r2 carry their own signums. The two reflecting surfaces S1 and S2 are spaced apart a separation distance D by a gap that optionally includes an optically transparent medium (OTM) 97 having a refractive index $\eta'$ in the wavelength region of interest; here, $\eta'$ may be 1 with no loss of generality. A lightwave approaches the GTR 91 at normal incidence, and a first component, with associated fractional amplitude r=r1, is reflected. The remainder of the lightwave, with fractional amplitude 1−r1, is transmitted through the OTM 97 toward the right, is fully reflected at the surface S2, and returns to the surface S1 at normal incidence. A second component, with fractional amplitude $(1-r1)^2\exp(\iota\phi)$, is transmitted through S1 toward the left, and a third component, with fractional amplitude $r1(1-r1)\exp(\iota\phi)$, is reflected at S1 and travels to the right toward S2. Here $$\phi = -4\pi\eta'D/\lambda \tag{11}$$

is the lightwave phase shift associated with a round trip of the lightwave from S1 to S2 to S1. The third component is fully reflected at the surface S2 and returns to the surface S1 with fractional amplitude $r1(1-r1)\exp(2\iota\phi)$. A fourth component, with fractional amplitude $r1(1-r1)^2\exp(2\iota\phi)$, is transmitted through S1 toward the left, and a fifth component, with fractional amplitude $r1(1-r1)\exp(2\iota\phi)$, is transmitted through the OTM 87 toward the right, is fully reflected at S2, and returns to the surface S1 at normal incidence. Suitable parameter choices for the GTR 91 in FIG. 4 are:

λ=1550 nm,
r1=0.430,
η'=1,
D=3×10³ μm, which correspond to FSR=0.4 nm and wavelength spacing of 25 GHz. The parameters of the GTRs for each stage are chosen separately.

This partial reflection/transmission/full reflection/transmission process takes place an unlimited number of times and produces the following sequence of fractional amplitudes moving toward the left away from the surface S1:

$$R = r1 + (1-r1)^2\exp(\iota\phi)\{1 + r1(1-r1)^2\exp(\iota\phi) + \tag{12}$$
$$r1^2(1-r1)^2\exp(2\iota\phi) + \ldots\}$$
$$= r1 + (1-r1)^2\exp(\iota\phi)/\{1 - r1\cdot\exp(\iota\phi)\}$$
$$= \{\exp(\iota\phi) - r1\}/(1 - r1\cdot\exp(\iota\phi)) = \exp(\iota\Phi).$$

The reflection magnitude |R|=1 so that the phase angle Φ is a real number. After clearing the denominator of all non-real quantities, one verifies that the phase angle Φ is expressible as $$\Phi = -2\cdot\tan^{-1}\{(1+r1)\tan(\phi/2)/(1-r1)\} \tag{13}$$
$$= 2\cdot\tan^{-1}\{(1+r1)\tan(2\pi\eta'D/\lambda)/(1-r1)\}.$$

The variable Φ is a distributed phase shift, resulting from contributions of the various components (second, fourth, sixth, etc.) that are transmitted from the OTM 97 toward the left in FIG. 4. The phase shift Φ depends upon wavelength λ, refractive index η' and GTR separation D through Eq. (11). The transmissivity factors for the two fibers 83F and 84F become $$T1(ft;\Phi) = \{1+\cos(2\pi ft+\Phi)\}/2, \tag{14}$$

$$T2(ft;\Phi) = \{1-\cos(2\pi ft+\Phi)\}/2, \tag{15}$$

A PSMZI is independently tuned according to the channel in which the PSMZI appears. If one channel in a given stage has a PSMZI, each channel in that stage has a PSMZI, and at least three stages have PSMZIs (rather than conventional MZIs) in a preferred embodiment. An advantage of providing PSMZIs in the first three stages is that fewer PSMZIs (seven) are needed with this configuration. However, three stages other than stages 1, 2 and 3 are chosen for use of the PSMZIs in a preferred embodiment.

Figure 5:
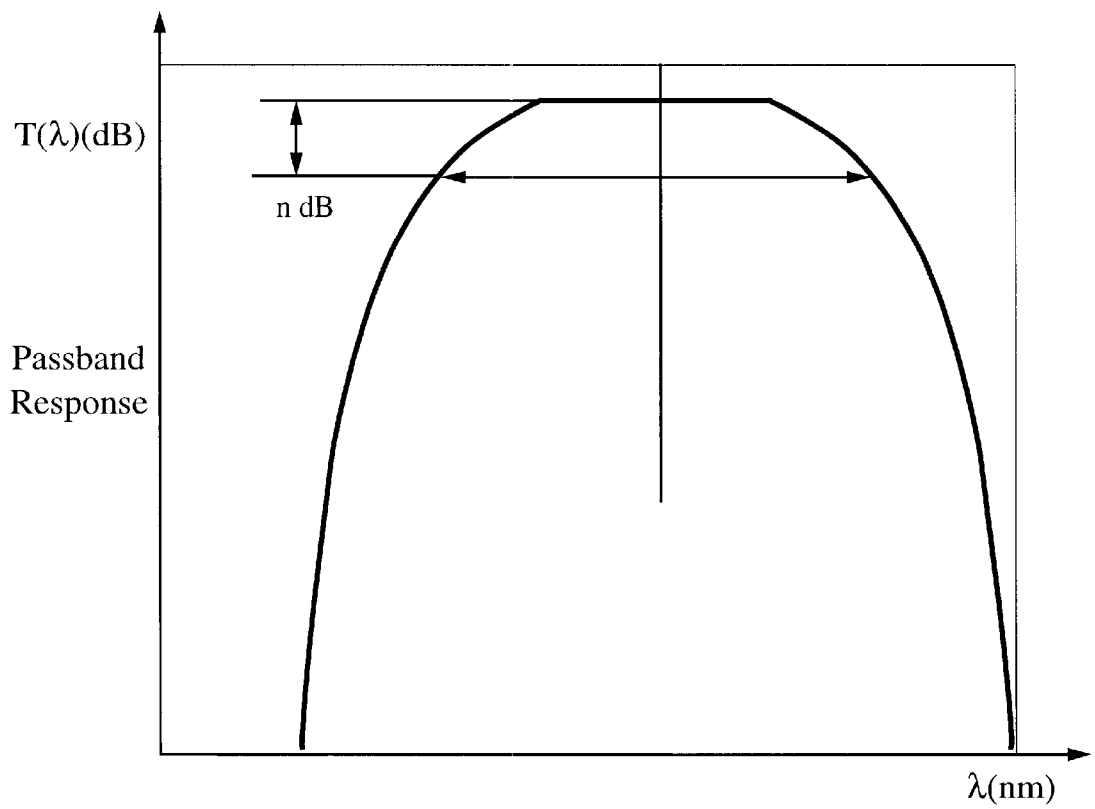
FIG. 5 graphically illustrates optical isolation and flat-top passband response standards.
Figure 6:
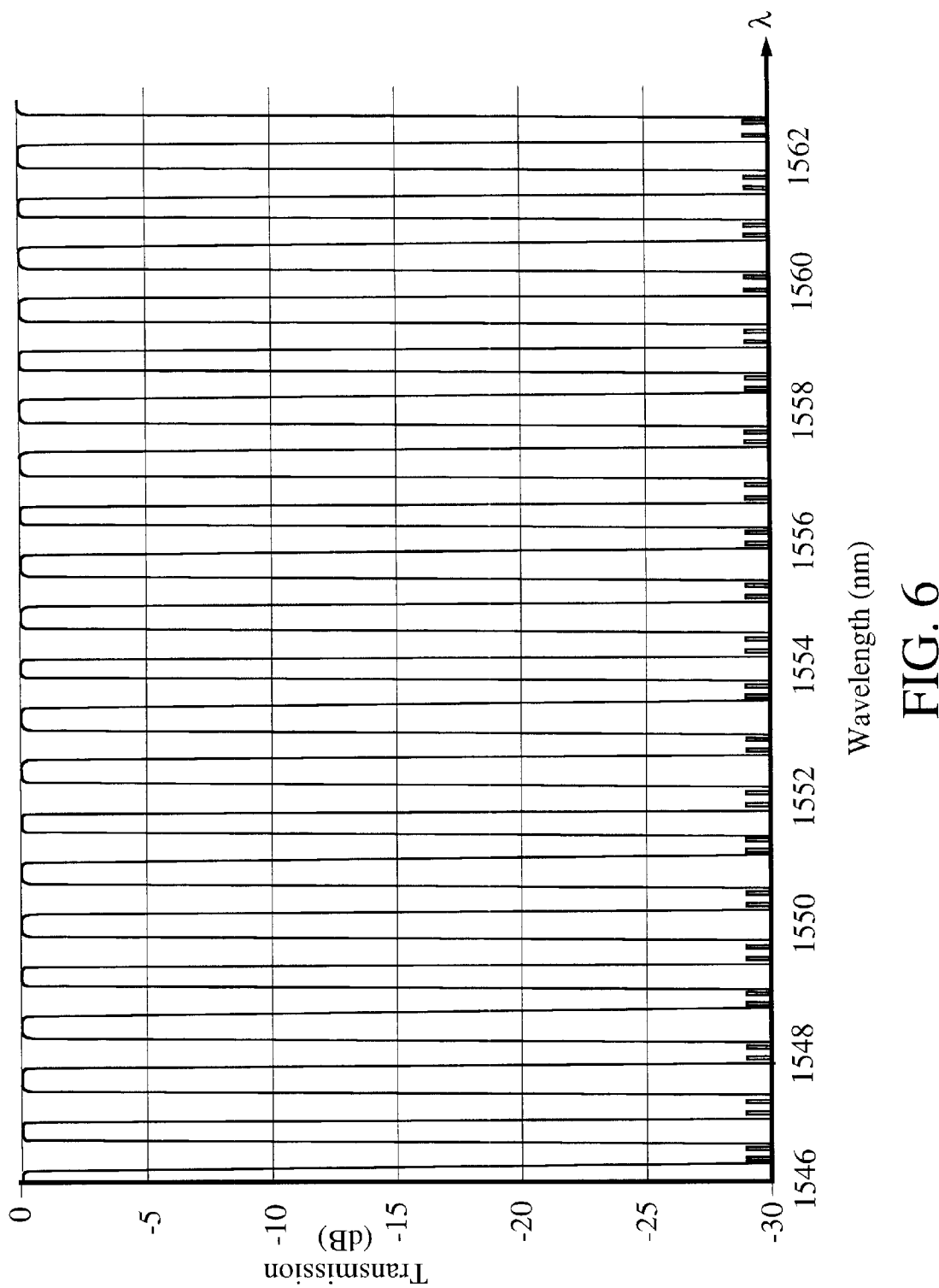
FIGS. 6, 7, 8, 9 and 10 graphically illustrate transmissivity versus wavelength for cascade tree structures with up to five stages, constructed according to the invention.
Figure 7:
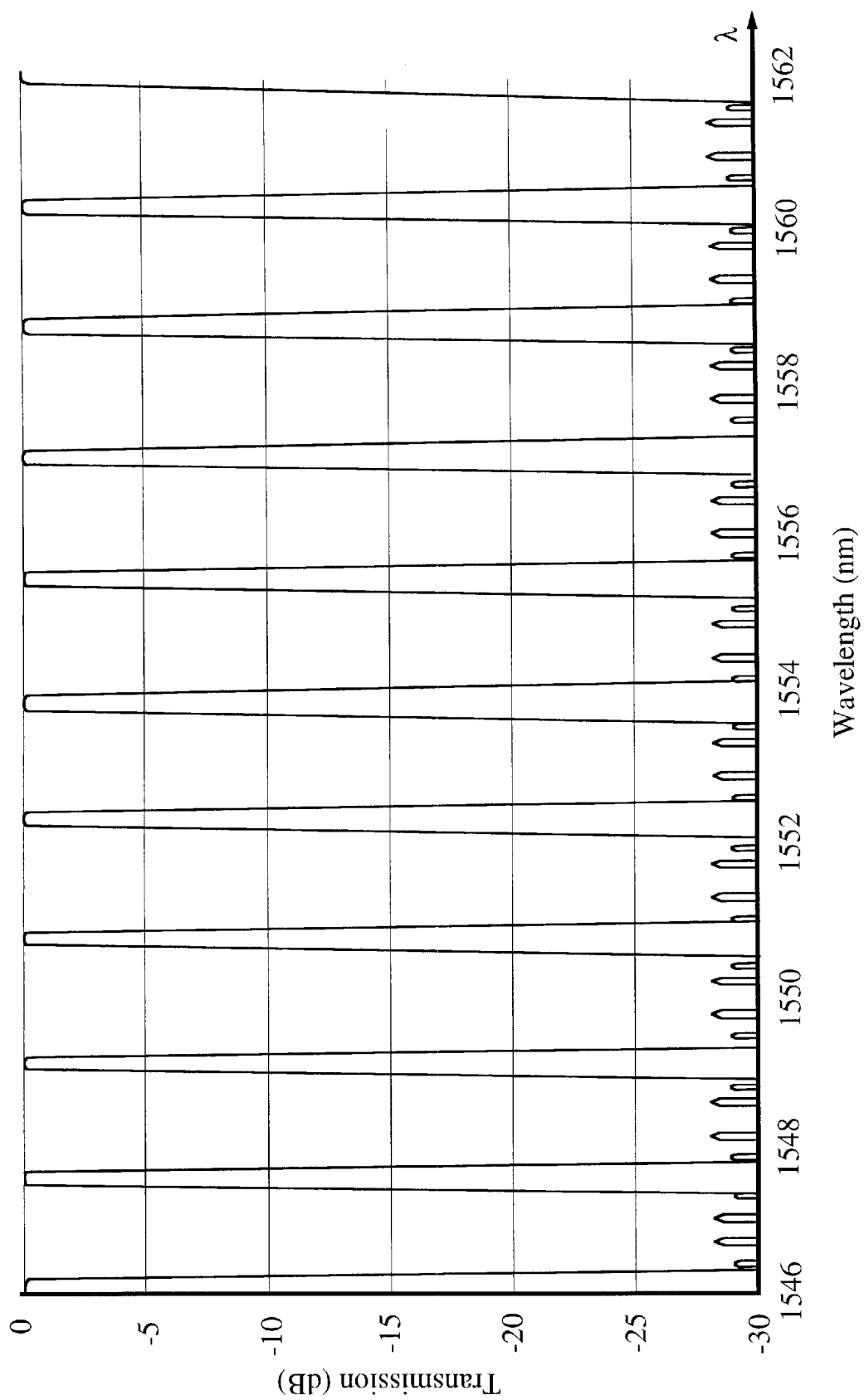
Figure 8:
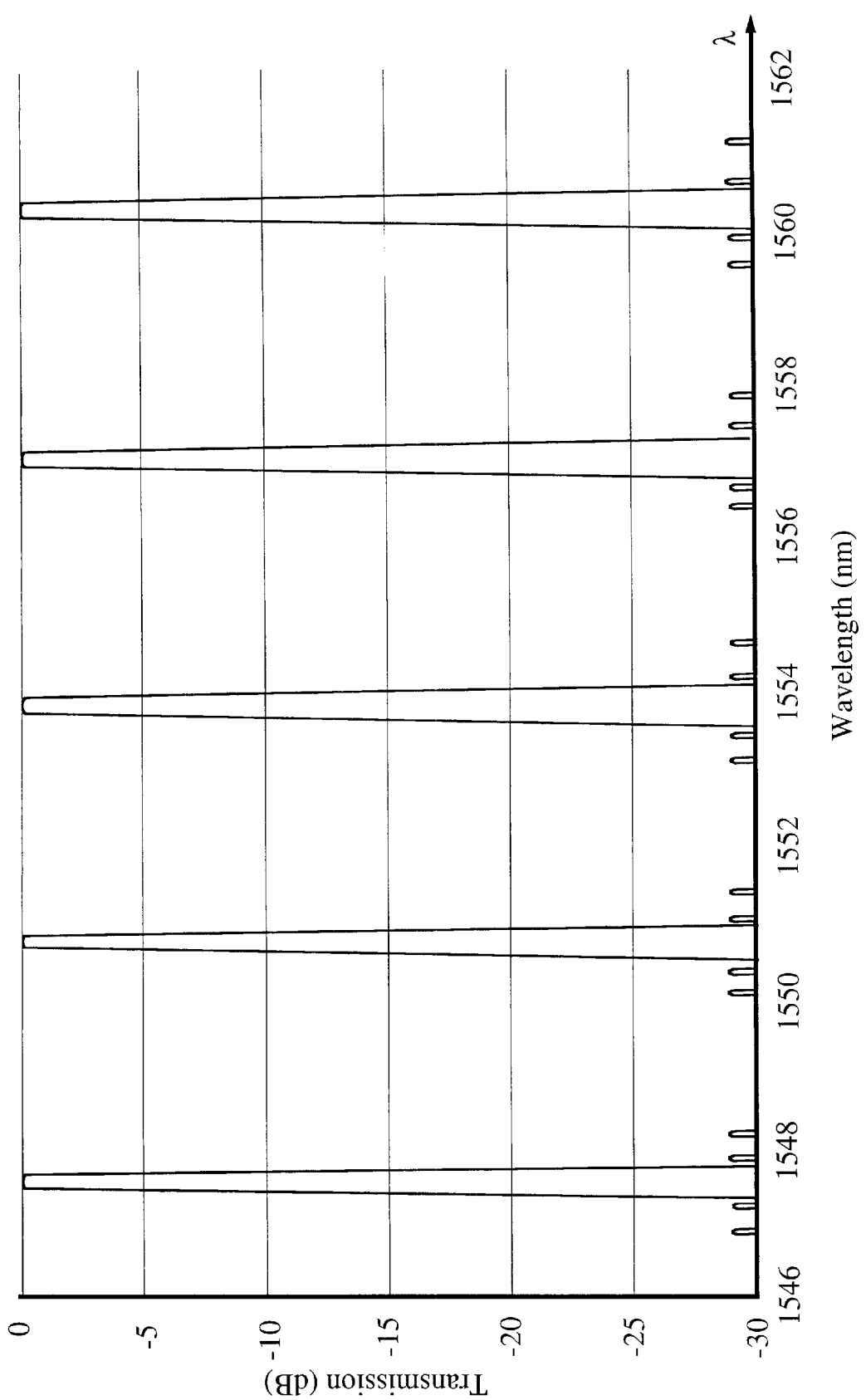
Figure 9:
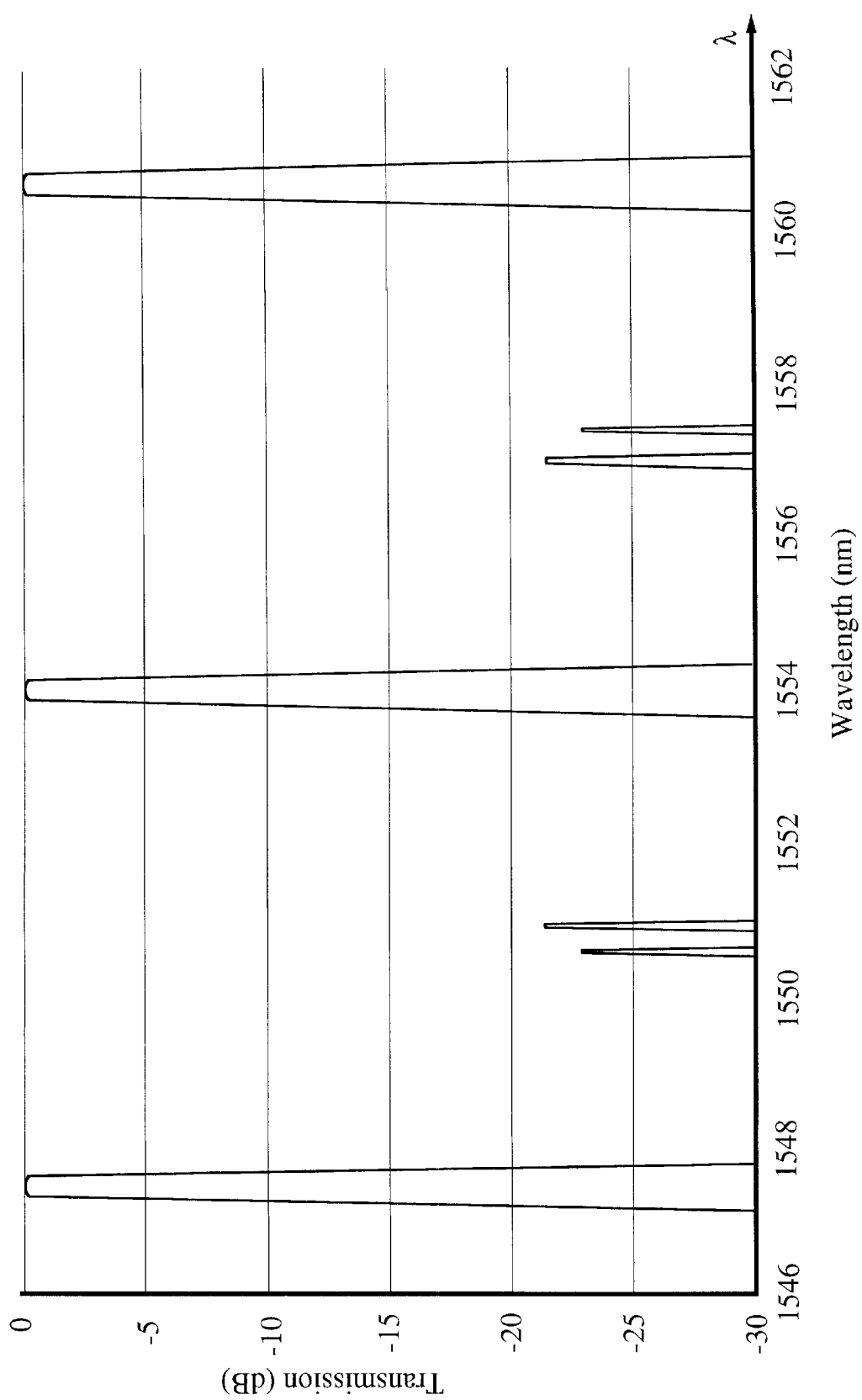
Figure 10:
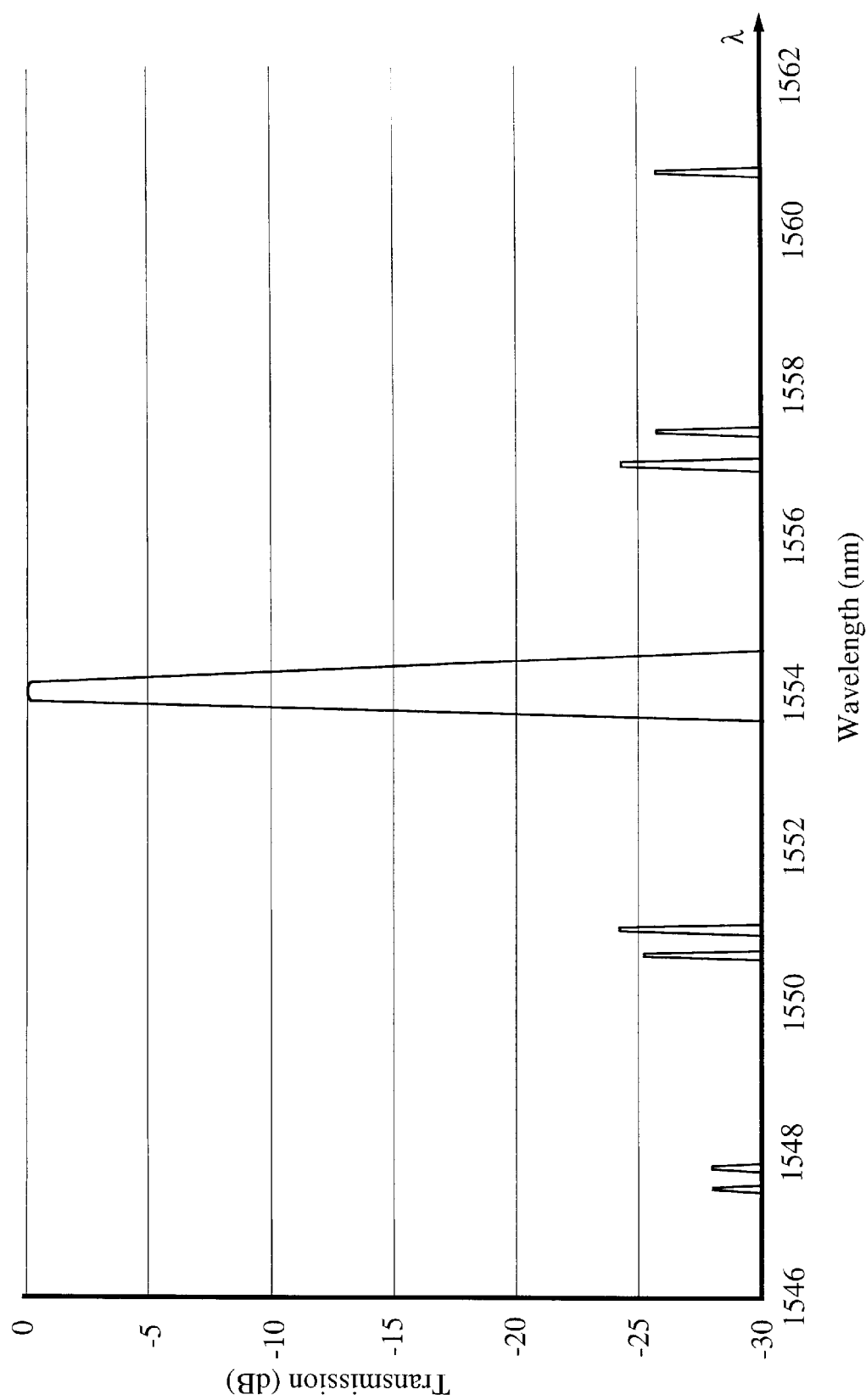

FIG. 5 illustrates the flat-top passband response and optical isolation required by the BellCore standards. These standards for certain individual decrements are set forth in Table 1.

TABLE 1

| Transmissivity Standards | |
|---|---|
| Decrement | Bandwidth Requirement |
| −1 dB | ≧ 0.35 times channel spacing |
| −3 dB | ≧ 0.50 times channel spacing |
| −20 dB | ≦ 1.5 times channel spacing |
| −30 dB | ≦ 2.2 times channel spacing |

The required channel spacings are 0.8 nm, 1.6 nm, 3.2 nm, 6.4 nm and 12.8 nm.

FIGS. 6, 7, 8, 9 and 10 are graphical views of transmissivity of light in adjacent wavelength sub-bands, expressed in dB, as a function of wavelength, at the output of a one-stage system, a two-stage system, a three-stage system, a four-stage system and a five-stage system, respectively, where all the first three stages have PSMZIs incorporated and stages four and five have only MZIs incorporated. Desired spacing for 32 output channels is 50 GHz. The spacing between central wavelengths for adjacent sub-bands increases by a factor of about two as one proceeds from one stage to two stages to three stages, and the width of each sub-band (FWHM) remains approximately the same, about 0.8 nm. The top of each peak in transmissivity is remarkably flat. Optical isolation is about 29 dB for output of each of the first three stages, about 22 dB for the fourth stage output, and about 24.5 dB for the fifth stage output. Provision of additional stages would further improve the optical isolation of the system output.

What is claimed is:

1. A system for processing light, the system comprising:
   an (N+1)-stage fiber optic cascade structure, numbered n=0, 1, 2, . . . , N with N≧5, with stage 0 being a light input channel, with stage number n' (1≦n'≦N) having a wavelength discrimination mechanism including a Mach-Zehnder interferometer, referred to as an "MZI", and having $2^{n'}$ fiber optic channels, with each channel in each stage n' being connected to two channels in stage n"+1 (n"=1, 2, . . . , N−1) through an MZI in stage n"+1; and
   wherein, in each of first, second and third selected stages, numbered n=n1, n=n2 and n=n3, with 0≦n1<n2<n3≦N, the MZI in each channel in that stage is combined with a phase shift mechanism, including first and second spaced apart, parallel light reflectors, that receives and re-emits light with a selected phase shift.

2. The system of claim 1, wherein said combined MZI and phase shift mechanism comprises:
   first and second optical fibers, received by a first fiber coupler and by a second fiber coupler, the couplers being spaced apart from each other and the optical length of a first fiber and of a second fiber between the first and second couplers being different from each other; and
   a phase shift mechanism, positioned to receive light from the first fiber between the first and second couplers, to introduce a selected phase shift between into the received light, and to re-emit the received and phase shifted light into the first fiber between the first and second couplers.

3. The system of claim 2, where said phase shifter mechanism comprises a Gires-Tournois resonator, including said first and second spaced apart, parallel light reflectors, that receives said light from said first fiber at substantially normal incidence and that re-emits said light into said first fiber with a selected phase shift that depends upon at least one of wavelength of said light, reflection coefficient of at least one of said first and second reflectors, separation distance between said first and second reflectors, and refractive index of a material positioned between said first and second reflectors.

4. The system of claim 1, wherein N=5 and at least one of said stage numbers n1, n2 and n3 is chosen from the set of stage numbers n1=0, n2=1 and n3=2.

5. A method for processing light, the method comprising:

providing an (N+1)-stage fiber optic cascade structure, numbered n=0, 1, 2, ..., N with $N \geq 5$, with stage 0 being a light input channel, with stage number n' ($1 \leq n' \leq N$) having a wavelength discrimination mechanism including a Mach-Zehnder interferometer, referred to as an "MZI", and having $2^n$ fiber optic channels, with each channel in each stage n' being connected to two channels in stage n"+1 (n"=1, 2, ..., N−1) through an MZI in stage n"+1; and in each of first, second and third selected stages, numbered n=n1, n=n2 and n=n3, with $0 \leq n1 < n2 < n3 \leq N$, the MZI passing the light in each channel in that stage through the MZI for that channel, combined with a phase shift mechanism, including first and second spaced apart, parallel light reflectors, that receives and re-emits light with a selected phase shift.

6. The method of claim 5, further comprising choosing said combined MZI and phase shift mechanism to comprise:

first and second optical fibers, received by a first fiber coupler and by a second fiber coupler, the couplers being spaced apart from each other and the optical length of the first fiber and of the second fiber between the first and second couplers being different from each other; and a phase shift mechanism, positioned to receive light from the first fiber between the first and second couplers, to introduce a selected phase shift between into the received light, and to re-emit the received and phase shifted light into the first fiber between the first and second couplers.

7. The method of claim 6, further comprising choosing said phase shifter mechanism to comprise a Gires-Tournois resonator, including said first and second spaced apart, parallel light reflectors, that receives said light from said first fiber at substantially normal incidence and that re-emits said light into said first fiber with a selected phase shift that depends upon at least one of wavelength of said light, reflection coefficient of at least one of said first and second reflectors, separation distance between said first and second reflectors, and refractive index of a material inserted between said first and second reflectors.

8. The method of claim 5, further comprising choosing N=5 and choosing at least one of said stage numbers n1, n2 and n3 from the set of numbers n1=0, n2=1 and n3=2.

* * * * *